United States Patent
Stephens

(10) Patent No.: US 7,567,176 B2
(45) Date of Patent: Jul. 28, 2009

(54) LOCATION-BASED ANTI-THEFT AND SECURITY SYSTEM AND METHOD

(76) Inventor: Randy Stephens, 24640 Stewart St., Loma Linda, CA (US) 92354

( * ) Notice: Subject to any disclaimer, the term of this patent is extended or adjusted under 35 U.S.C. 154(b) by 0 days.

(21) Appl. No.: 11/130,480

(22) Filed: May 16, 2005

(65) Prior Publication Data

US 2005/0253714 A1 Nov. 17, 2005

Related U.S. Application Data

(60) Provisional application No. 60/572,130, filed on May 17, 2004.

(51) Int. Cl.
G08B 13/14 (2006.01)
(52) U.S. Cl. .................. 340/568.1; 340/5.2
(58) Field of Classification Search ......... 340/500–580, 340/57, 2, 426, 5.2; 726/9, 20
See application file for complete search history.

(56) References Cited

U.S. PATENT DOCUMENTS 5,966,081 A * 10/1999 Chesnutt .................... 340/5.64
2002/0116509 A1 * 8/2002 DeLaHuerga ................ 709/229
2002/0129246 A1 * 9/2002 Blumenau et al. ............ 713/168
2002/0163418 A1 * 11/2002 Nemoto ....................... 340/5.2

OTHER PUBLICATIONS

Senforce Technologies, Inc. Website-www.senforce.com, prior to at least May 17, 2004.

* cited by examiner

Primary Examiner—Daniel Wu
Assistant Examiner—Shirley Lu
(74) Attorney, Agent, or Firm—Dean Craine

(57) ABSTRACT

An anti-theft and file security system for a portable electronic device that uses a wireless transceiver coupled to the electronic device, which detects an identifying RF signal produced by a wireless access point. In the preferred embodiment, the access point is connected to a local or wide area network within a geographical area in which the portable electronic device is operated. During use, the RF signal from the access point is detected by a wireless transceiver. Loaded into the memory of the electronic device is a software program that determines if the RF signal is produced by a recognized access point. If the RF signal produced by the access point is recognized, then the electronic device continues to operate and allows full access to secured files loaded thereon. If no RF signal is detected or if the detected RF signal is from a non-recognizable access point, then operation of the electronic device is terminated and/or access to the secured file is blocked.

7 Claims, 4 Drawing Sheets

LOCATION-BASED ANTI-THEFT AND SECURITY SYSTEM AND METHOD

BACKGROUND OF THE INVENTION

1. Field of the Invention

This utility patent application is based on the provisional patent application (Ser. No. 60/572,130) filed on May 17, 2004.

2. Description of the Related Art

Anti-theft systems and devices used with electronic devices, such as desktop and laptop computers, typically include locks and cables that securely attach the electronic devices to a fixed surface or object. If the cable or lock is broken, an alarm is automatically activated. Other anti-theft devices may motion detecting alarms, and vicinity alarms that are automatically activated when the electronic device is moved. A major drawback with such a device is that the electronic devices still operate after they are physically removed from the area.

Various data security software programs have been used to protect important data files stored within the electronic device. Such programs typically require the user to enter a user name and password, or a security card into the electronic device to access and alter these data files.

In the medical industry, it is common practice to use laptop computers, tablet computers, and PDA's to connect to a local area network within a healthcare facility. Typically, these devices are used to retrieve medical information contained in a patent's medical database file. Because a patient's medical information is highly confidential, network administrators must institute adequate security measures to limit access to these files only to authorized individuals. Unfortunately, controlling access to a large group of employees, nurses, physicians and other hospital personnel is very cumbersome and unmanageable.

Many businesses, such as coffeehouses and bookstores, offer wireless Internet access to their customers when they visit their business. Typically, customers bring their WiFi enabled laptop computers, PDA's or smart cellular telephones with them to the business and then connect to the Internet via a wireless access point located in the business. Unless additional security measures are taken by the customers, the wireless transceivers used by the customers' to communicate with the wireless access point may provide the customers access to files on each other's devices.

What is needed is an improved anti-theft and file security system for a portable electronic device that either inactivates the electronic device or prevents access to designated specific files on the electronic device when the electronic device is located outside a designated area.

SUMMARY OF THE INVENTION

It is an object of the invention to provide a computer network anti-theft system that limits operation of the electronic device capable of connecting the network to a designated area.

It is another object of the invention to provide such a system that also prevents or limits access to files on the electronic device when the electronic device is removed from a designated area.

These and other objects of the present invention are met by an anti-theft security system disclosed herein that uses a RF signal detection means coupled to a portable electronic device which detects an identifying RF signal produced by a RF signal generating means located within a designated geographical region. When the electronic device is located within the geographical region, and an identifying RF signal is detected, the electronic device functions normally and allows full access to data files stored on the electronic device. The RF signal generating means may be a single device or multiple devices located in different locations within the geographic region. When the electronic device is removed from the geographic region so that the identifying RF signal is no longer detected, the electronic device becomes inactive and access to data files in the electronic device are blocked.

Loaded into the working memory of the electronic device is a software program that determines if the electronic device is connected to a computer network and whether an identifying RF signal is received from a RF signal generating means located in the geographic region. When the RF signal is detected, the software program allows full operation of the electronic device and access to its data files. More specifically, when an RF signal is detected by the RF signal detection means coupled to the electronic device, the identification codes associated with the RF signal generating means are delivered to the software program. The software program then compares the received identification codes with the table of identification codes previously entered into the software program. When no RF signal is detected, or when a set of identification codes are received but not found on the table, the software program either deactivates the electronic device completely and/or blocks access to some or all of the data files on the electronic device.

When setting up the system, the software program prompts the user to elect all, some or one specific data file on the electronic device to be encrypted, and then assigns a name for the geographical region. The user then identifies the RF signal generating means in the geographic region and enters and assigns the media access control code (MAC code) or some other media identification code for each RF signal generating means into the software program. The software program then associates the identification codes with the encrypted data file(s) so that when a RF signal from a RF signal generating means with a recognized identification code is received, access to the encrypted data file(s) is provided.

In the preferred embodiment, the RF signal generating means is a wireless access point capable of communicating with a WiFi transceiver connected to the electronic device. The wireless access point may be wired or wirelessly connected to a local or wide area network to enable other electronic devices connected to the network to communicate with the electronic device. The encrypted files and/or identification codes can be permanently stored on the electronic device or stored in portable peripheral device(s) (also called a 'key') that selectively connect directly or wirelessly to a port(s) or connector(s) on the electronic device.

Also disclosed herein is a method for controlling the operation and/or access to data files on an electronic device using the above described system.

DESCRIPTION OF THE PREFERRED EMBODIMENT(S)

Shown in the accompanying FIGS. 1-4 is a location based, anti-theft, security system 10 for a portable electronic device 30 used to control operation of the electronic device 30 and/or access to selected files 35 on the electronic device 30 when the electronic device 30 is operated within a geographic region 40.

Figure 1:
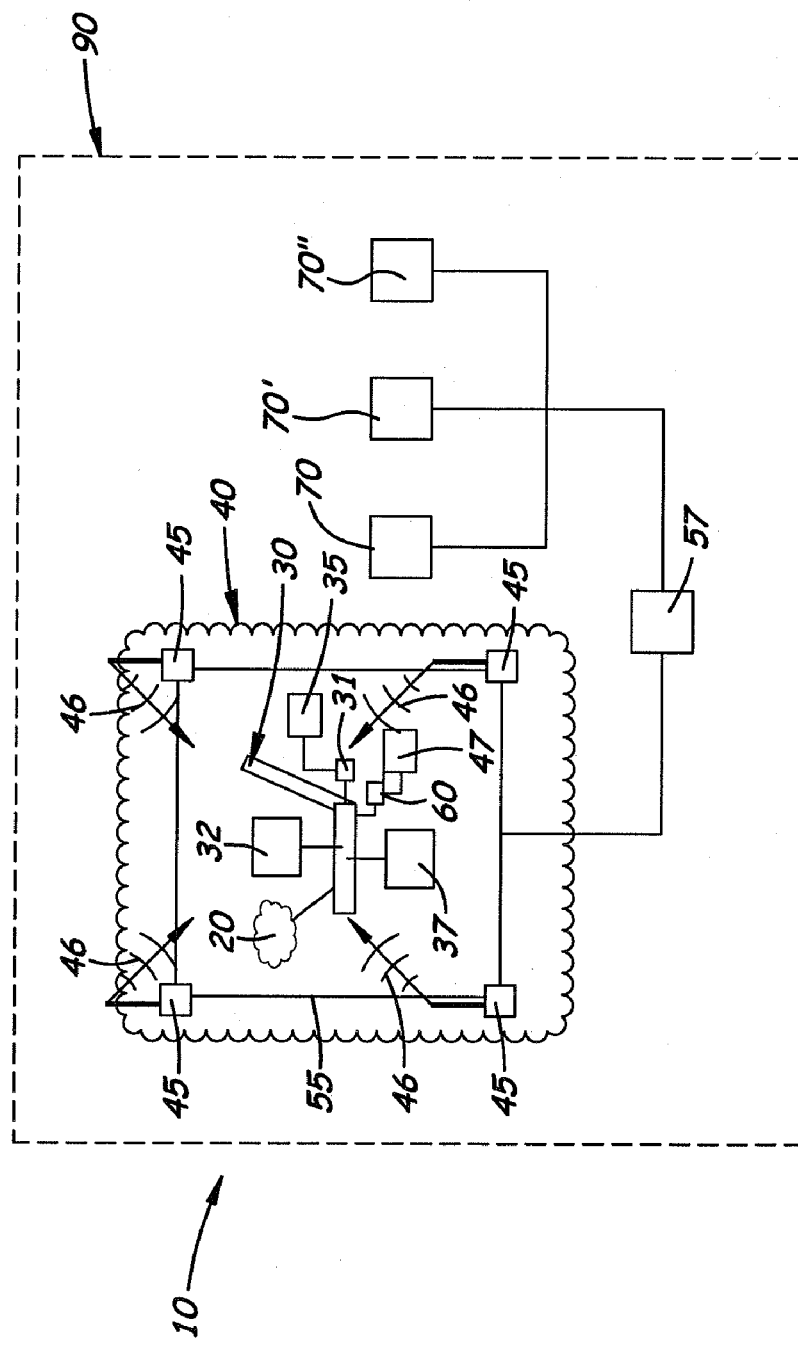
FIG. 1 is a diagram of a pre-defined area with a RF signal generating means that acts as access points to a local area network

The system 10 is used in a geographic region 40 where the electronic device 30 is intended to be operated. In one embodiment, shown in FIG. 1, the geographical region 40 is located inside a building 90. It should be understood that the geographical region 40 however maybe located outside a building or between buildings. Located within the geographical region 40 is at least one RF signal generating means 45 designed to produce an RF signal 46. Each RF signal generating means 45 has a unique, identifying code (e.g. media access code, MAC) 47 assigned to it by its manufacturer or the network administrator. In the preferred embodiment, the RF signal generating means 45 is a wireless access point capable of being connected to a local area network 55 created inside or around the building 90. FIG. 1 shows the system 10 with four RF signal generating means 45 located within the geographic region 40 and connected to a local area network 55 with a central server 57. The central server 57 is connected to a plurality of electronic devices 70, 70,' 70" located outside of the geographic region 40.

Connected to the electronic device 30 is a wireless transceiver 32 capable of detecting a RF signal 46 produced by one of the RF signal generating means 45. When the wireless transceiver 32 detects a RF signal 46, the unique identification code 47 associated with the RF signal generating means 45 is received and processed by a software program 20 loaded into the working memory 31 of the electronic device 30.

When initially setting up the electronic device 30 for use on the system 10, the user opens the software program 20 and assigns a name for the geographical region 40. The user then selects files 35 (called private data files 35) on the electronic device 30 in which access to others is limited. The user then enters into the software program 20 all of the identification codes 47 for some or all of the RF signal generating means 45 located in the geographical region 40. The software program 20 then links the identification codes 47 for all of the RF signal generating means 45 to the files 35 so that when a RF signal 46 from RF signal Generating means 45 is received, access to the file 35 may be granted.

The identification codes 47 may be stored on the electronic device 30 or they may be stored in a portable peripheral device 60 that selectively connects directly or wirelessly to a port or connector on the electronic device 30.

An important aspect of the system 10 is that when the electronic device 30 does not receive an RF signal 46 or receives an RF signal from a non-recorded RF signal generating means 45 or other electronic devices 70, 70', 70" or does not have access to the identification code 47, the software program 20 automatically blocks access to the files 35.

Figure 2:
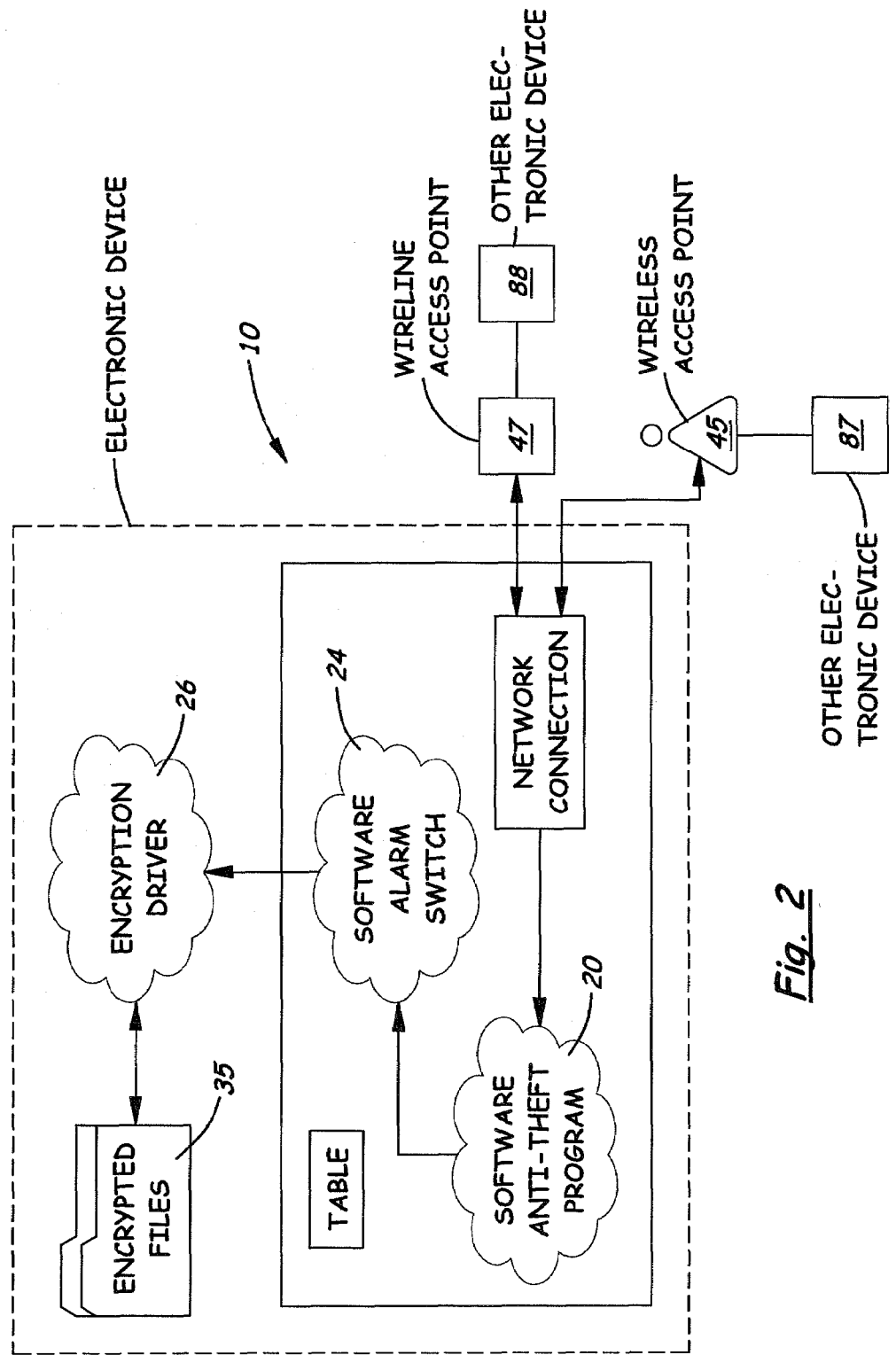
FIG. 2 is a box diagram of the anti-theft system disclosed herein showing the table, file storage and the encryption driver all located inside the electronic device.

As shown in FIG. 2, when a RF signal 46 from a non-registered RF signal generating means 45 is detected, an optional software alarm switch 24 located in the electronic device 30 may be activated. When the switch 24 is activated, the encryption driver 26 blocks access to the files 35 until unlocked when the RF signal 46 from a registered RF signal generating means 45 is received or until a security code is entered into the software program 20 by the user. When the identification codes are stored in a portable peripheral device 60, and access to the files 35 is attempted, the optional software alarm switch 24 may also be activated and inactivated only when a portable peripheral device 60 containing the correct identification code 47 is connected to the electronic device 30.

In the preferred embodiment, the system 10 is designed to be used in a local or wide area computer network 55. With such applications, the system 10 may be used with both wireless and wireline access points 45, 47, respectively, as shown in FIG. 2. When the access points 45, 47 are network hubs, other electronic devices 87, 88 may connect to the network and communicate with the electronic device 30. In both applications, the software program 20 is set up to continually detect the presence or absence of a RF signal 46 from the wireless access point 45 or wireless access point 47.

Figure 3:
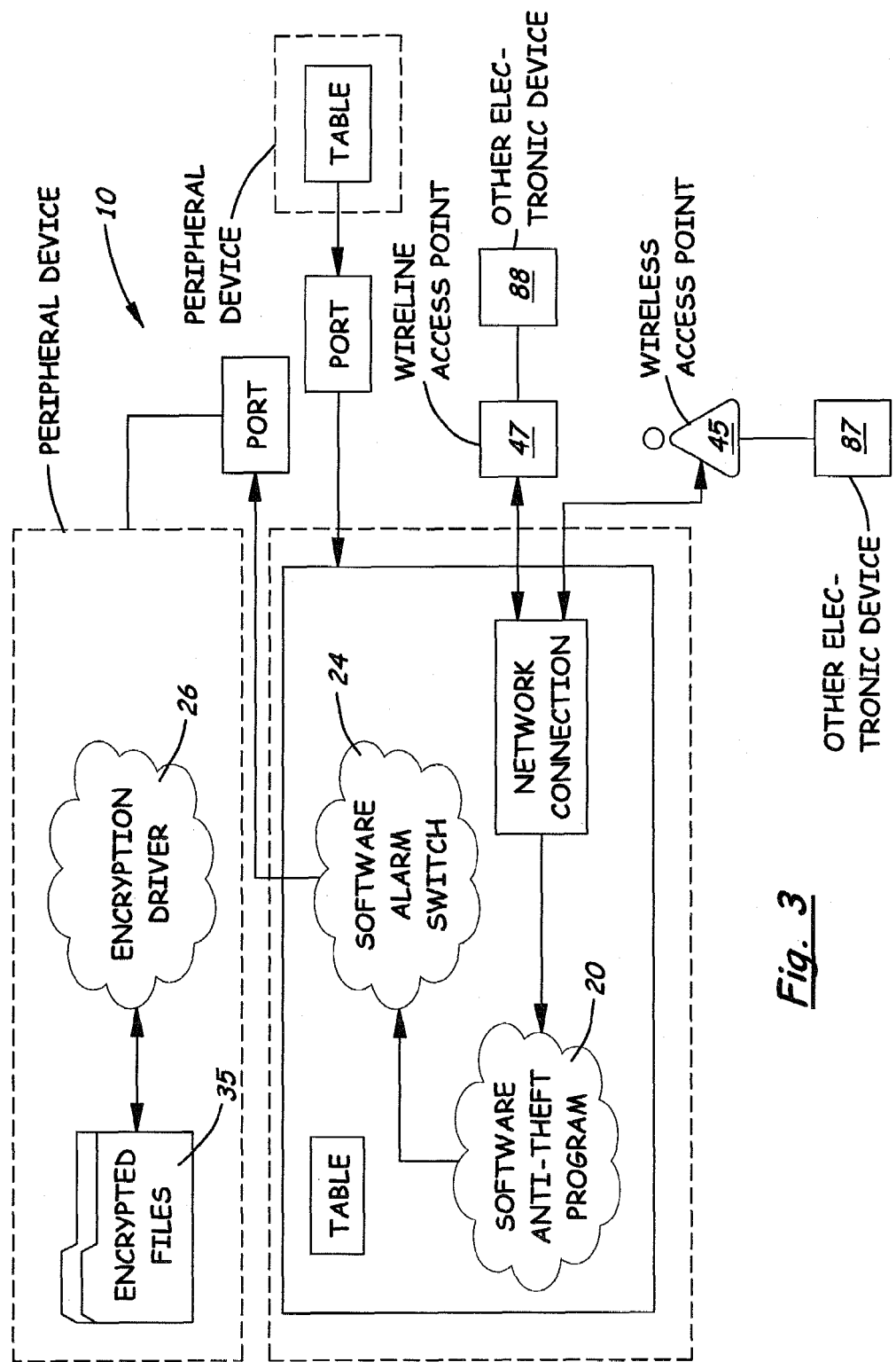
FIG. 3 is a box diagram of the anti-theft system disclosed herein showing the table located in a separate portable peripheral device that connects to a port on the electronic device and showing the file storage and encryption driver also located in a portable peripheral device that connects to a port on the electronic device.

In the first embodiment shown in FIG. 2, the private data files 35, the encryption driver 26, and the table 39 are all located on the electronic device 30. As shown in FIG. 3, the private data files 35 and the driver 26 can be stored on a separate peripheral device 60 that connects to a wire or wireless port 33 on the electronic device 30. In addition, the table 39 may be stored also on a second peripheral device 65 that also connects to the same wired or wireless port 33 or to a different port 36 (shown).

Figure 4:
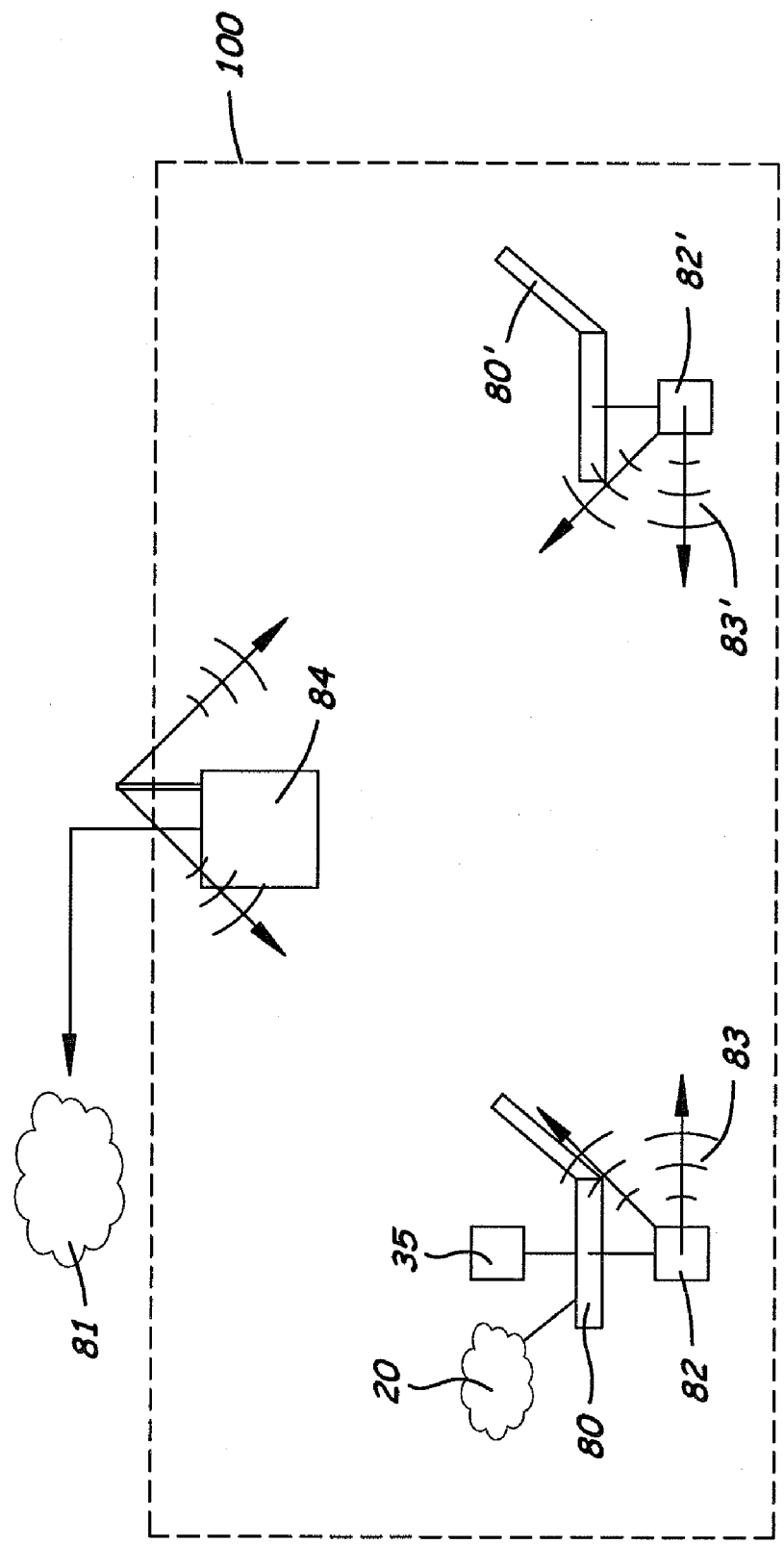
FIG. 4 is a diagram of a business with a wireless access point connected to the Internet and two laptop computers located in the business each capable of communicating with the wireless access point, with one laptop computer including the system disclosed herein that blocks access to files to the user of the other laptop computer.

FIG. 4 is a diagram of a business 100, such as coffeehouse or bookstore, that offers wireless access to a wide area network 81, such as the INTERNET to their customers when they visit the business. Two laptop computers 80, 80' are shown located in the business 100 and operated by different customers. Each computer 80, 80' is connected to a wireless card 82, 82', respectively, that communicates with a wireless access point 84 located in the business 100. The wireless access point 84 may be directly connected to an wide area network 81 or connected to a router (not shown) then in turn connected to the wide area network 81. The first laptop computer 80 includes the software program 20 previously setup with designed encrypted files 35 with limited access. When the RF signal 83 from the wireless card 82 on the second laptop computer 80' is detected by the first laptop computer 80, the software program 20 determines that the identity of the second laptop computer 80' is unknown, therefore access to the encrypted files 35 is blocked.

In addition to the above-described system 10, an anti-theft and file security method for an electronic device 30 is also provided comprising the following steps:

a. selecting a geographical region 40 where an electronic device 30 with private data files 35 are operated;

b. installing at least one RF signal generating means 45 within said geographical region 40;

c. selecting an electronic device 30 having access to private data files 35;

d. connecting a RF signal detecting means 45 to said electronic device 30;

e. loading a software program 20 into said electronic device 30 capable of allowing access to said private data files 35 when said RF signal 46 is identified.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An anti-theft and file security system for a portable electronic device, comprising:
   a. a computer network in a designated geographic region:
   b. a portable electronic device that moves into and out of said designated geographic region, said portable electronic device includes working memory;
   c. at least one private file executable or accessible by said portable electronic device;
   d. a wireless signal detecting means coupled to said portable electronic device;
   e. a remote signal generating means that produces an identifiable signal within said designated geographic region, said identifiable signal from said remote signal generating means being detected by said signal detecting means coupled to said portable electronic device only when said portable electronic device is moved into said designated geographic region, each said identifiable signal being associated with an identification code that identifies said remote signal generating means;
   f. a software program loaded into the working memory of said electronic device, said software program generates a table that enables a user to selectively associate said private file with an identification code associated with an identification signal from a remote signal generating means within a designated geographic region, said software program enabling execution or access to said private file listed in said table when said signal generating means on said electronic device detects an identifiable signal from a remote signal generating means that is assigned to an identifiable code that matches said identifiable code in said table.

2. The anti-theft and file security system for a portable electronic device as recited in claim 1, wherein said table is stored within said electronic device.

3. The anti-theft and file security system for a portable electronic device as recited in claim 1, wherein said table is stored in a peripheral device connected to said electronic device.

4. The anti-theft and file security system for a portable electronic device as recited in claim 1, wherein said private file is stored in a peripheral device connected to said electronic device.

5. The anti-theft and file security system for a portable electronic device as recited in claim 4, wherein said table is stored in a peripheral device connected to said electronic device.

6. An anti-theft and file security method for an electronic device is also provided comprising the following steps:
   a. selecting a geographic region;
   b. installing at least one wireless signal generating means within said geographic region, said wireless signal generating means produces a wireless identifiable signal, said wireless identifiable signal being associated with a unique identification code;
   c. selecting a portable electronic device that includes a wireless signal detection means that detects said wireless identifiable signal from said wireless signal generating means, said portable electronic device executes or accesses a protected file, said electronic device includes a software program that creates a table that associates said protected file with said identification code associated with an identification signal from a wireless signal generating means, whereby when no identifiable signal is detected or when an identifiable signal is detected by said wireless signal detecting means, but the identification code associated with said wireless identifiable signal does not match the identification code in said table, the execution or access to said private file is denied, but when the identification code associated with said wireless identification signal matches the identification code in said table, execution or access to said private file is permitted;
   d. operating an electronic device within the geographic region; and,
   e. attempting to execute or access said private file.

7. An anti-theft and file security method for an electronic device comprising the following steps:
   a. selecting a portable electronic device temporarily moved and operated in a designated region, said electronic device includes a wireless signal detecting means for detecting an identification signal and an identification code associated therewith from a wireless signal generating means located in said designated region, said electronic device includes a software program that generates a table that enables a user to selectively associate a protected file with the identification code associated with a identification signal, said software program enables the execution or access to said private file listed in said table when said wireless signal generating means on said electronic device detects an identifiable signal from a remote signal generating means that is assigned to an identifiable code that matches said identifiable code in said table;
   b. moving said portable electronic device to the designated region;
   c. activating said signal detecting means to receive a wireless identification signal from a remote signal generation means operating in said designated region;
   d. requesting execution or access to said private file;
   e. determining if said identification signal is received and whether the identification code assigned to said identification signal is assigned to said private file in said table; and,
   f. permitting execution or access to said private file if the identification code associated with the identification signal received by said electronic device matches the identification code in said table and denying execution or access to said protected file if said identification code associated with the identification signal received by said electronic does not matches the identification code in said table.

* * * * *